(12) United States Patent
Mason

(10) Patent No.: US 12,293,464 B2
(45) Date of Patent: *May 6, 2025

(54) SYSTEMS AND METHODS FOR GENERATING A PROXY MESH FOR A POLYGONAL MESH THAT INCLUDES SUB-MESHES

(71) Applicant: Electronic Arts Inc., Redwood City, CA (US)

(72) Inventor: Ashton Mason, Brighton (GB)

(73) Assignee: Electronic Arts Inc., Redwood City, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 17/735,702

(22) Filed: May 3, 2022

(65) Prior Publication Data

US 2022/0327782 A1    Oct. 13, 2022

Related U.S. Application Data

(63) Continuation of application No. 17/226,945, filed on Apr. 9, 2021, now Pat. No. 11,354,861.

(51) Int. Cl.
*G06T 17/20* (2006.01)
(52) U.S. Cl.
CPC ........ *G06T 17/205* (2013.01); *G06T 2210/56* (2013.01)
(58) Field of Classification Search
CPC ......... G06T 15/06; G06T 15/08; G06T 17/10; G06T 17/205; G06T 2219/008
See application file for complete search history.

(56) References Cited

U.S. PATENT DOCUMENTS

| 9,607,431 | B2 * | 3/2017 | Schlei | G06T 17/00 |
| 11,217,016 | B1 * | 1/2022 | Mason | G06T 17/20 |
| 2003/0052875 | A1 | 3/2003 | Salomie | |

(Continued)

OTHER PUBLICATIONS

Li, Wei. "GPU-Based Computation of Voxelized Minkowski Sums with Applications," Ph.D. Thesis, University of California, Berkeley, pp. 1-108 (2011).

(Continued)

*Primary Examiner* — Phuc N Doan
(74) *Attorney, Agent, or Firm* — Leydig, Voit & Mayer, Ltd.

(57) ABSTRACT

A method, device, and computer-readable storage medium for generating a proxy mesh. The method includes: receiving an input polygonal mesh that includes multiple sub-meshes, each of which is a polygonal mesh, where the input polygonal mesh is a computer representation of a three-dimensional (3D) object; generating a voxel volume representing the input polygonal mesh, wherein the voxel volume comprises voxels that approximates a shape of the 3D object, wherein a first set of voxels of the voxel volume includes voxels that are identified as boundary voxels that correspond to positions of polygons of the multiple sub-meshes of the input polygonal mesh; determining a grouping of two or more sub-meshes that together enclose one or more voxels of the voxel volume other than the voxels in the first set of voxels; and generating a proxy mesh corresponding to the input polygonal mesh based on the grouping of two or more sub-meshes.

20 Claims, 13 Drawing Sheets

(56) References Cited

U.S. PATENT DOCUMENTS

| | | | |
|---|---|---|---|
| 2004/0070583 A1* | 4/2004 | Tsai | G06T 17/10 |
| | | | 345/419 |
| 2005/0219245 A1* | 10/2005 | Tao | G06T 17/20 |
| | | | 345/424 |
| 2006/0290695 A1* | 12/2006 | Salomie | G06T 17/20 |
| | | | 345/423 |
| 2009/0295800 A1* | 12/2009 | Vetter | G06T 15/08 |
| | | | 345/424 |
| 2014/0375636 A1 | 12/2014 | Young et al. | |
| 2017/0178388 A1* | 6/2017 | Bisson | G06T 17/00 |
| 2019/0221034 A1 | 7/2019 | Mason | |
| 2021/0074056 A1 | 3/2021 | Mason | |

OTHER PUBLICATIONS

U.S. Appl. No. 17/226,945, filed Apr. 9, 2021.

* cited by examiner

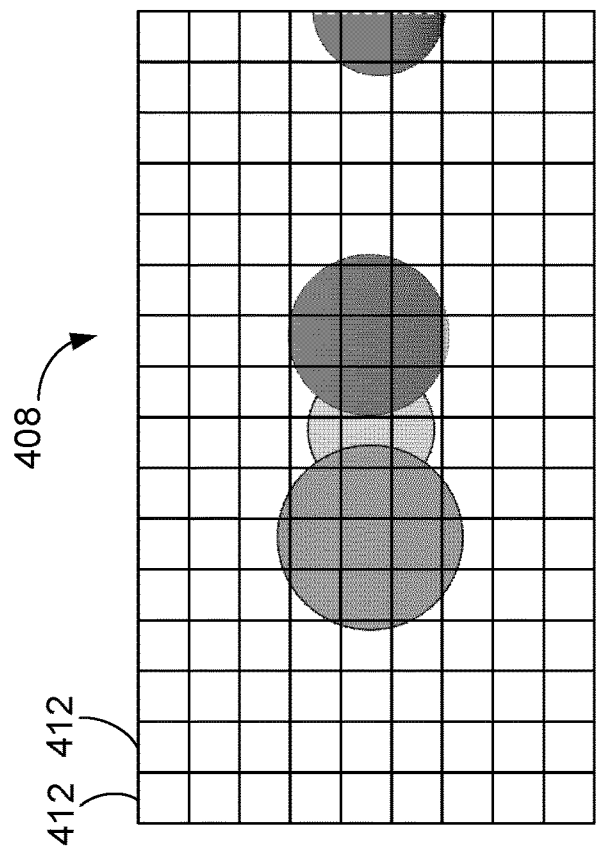
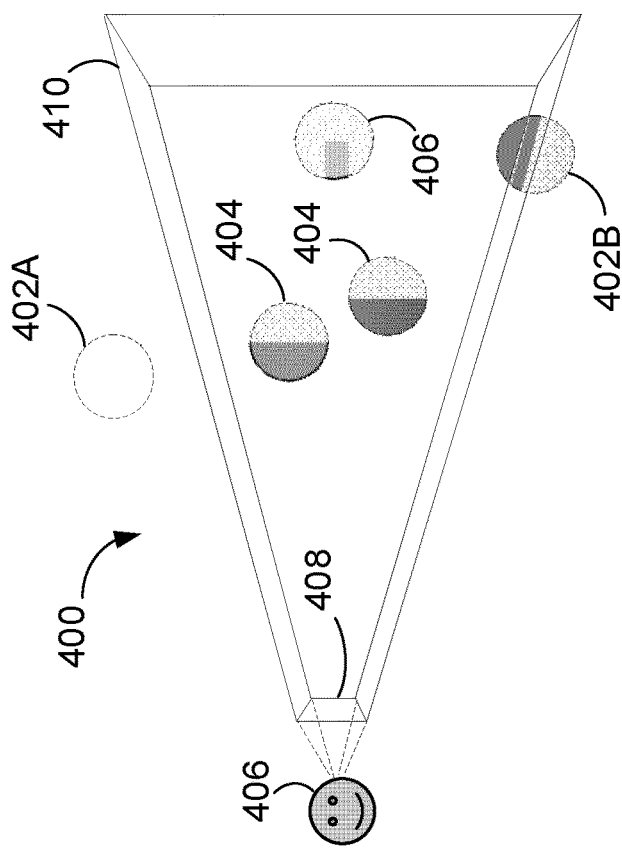
FIG. 4B
FIG. 4A

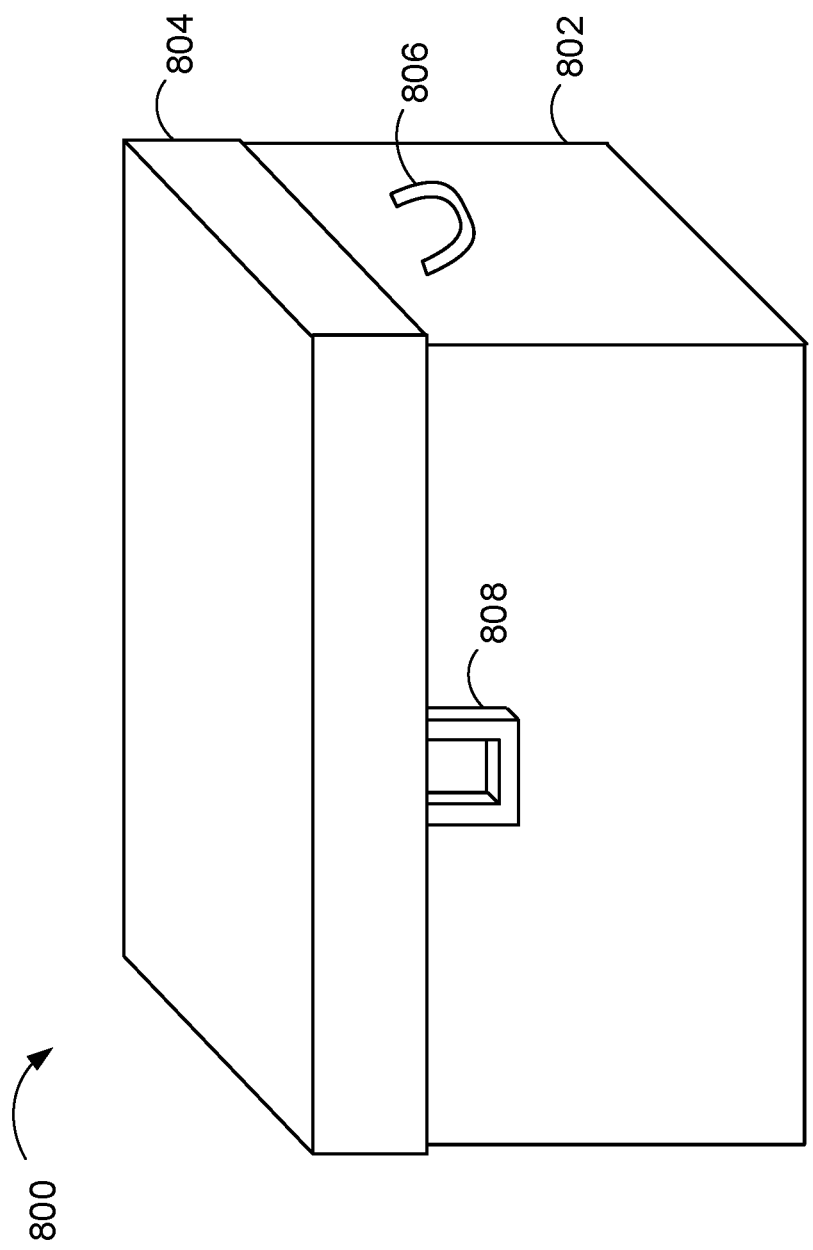

SYSTEMS AND METHODS FOR GENERATING A PROXY MESH FOR A POLYGONAL MESH THAT INCLUDES SUB-MESHES

CROSS-REFERENCE TO RELATED APPLICATIONS

This application is a continuation of U.S. patent application Ser. No. 17/226,945, filed on Apr. 9, 2021, which is hereby incorporated by reference in its entirety.

FIELD

This disclosure generally relates to computer graphics and, more particularly, to systems and methods for generating a proxy mesh for a polygonal mesh that includes sub-meshes.

BACKGROUND

For three-dimensional (3D) graphics applications, such as video games or animated films, efficient processing of data by reducing computational complexity of a given operation is often useful. This is particularly the case in real-time applications, such as video games.

Various operations can be performed using computer generated objects in a scene. An object may be represented as a polygonal mesh, which comprises a collection of vertices, edges, and faces that define the shape and/or boundary of the object.

One technique for reducing the computational complexity of an operation involving an artist-authored object is to perform the operation using a "proxy object" for the artist-authored object. A proxy object may be a simpler object (i.e., a simpler polygonal mesh) made to look like the artist-authored object. The proxy object can be used as a stand-in for the artist-authored object for performing operations involving the artist-authored object to reduce computational complexity, such as, for example, when the artist-authored object is only visible from far away from a camera location. In some implementations, the full resolution, artist-authored object may not be needed for the operation, and so there are circumstances in which a lower resolution, simplified object (i.e., the proxy object) is more appropriate to use in the operation in order to reduce the resource cost of performing the operation.

One conventional approach to generating a proxy object involves Laplacian smoothing. In Laplacian smoothing, a polygonal mesh is updated in a series of steps. In each step, each vertex of the polygonal mesh is moved to a new location that is calculated as an average of the positions of the neighbor vertices of the vertex in the polygonal mesh. The neighbor vertices are the vertices connected to a given vertex by an edge. A well-known problem of Laplacian smoothing is that it tends to "wither" the polygonal mesh, reducing its volume and making it thinner. Too much withering can make the final mesh that results from multiple passes of performing Laplacian smoothing a poor match for the original polygonal mesh, albeit very smooth, thus making the final mesh a poor choice to use as a proxy object.

Another problem with conventional techniques for generating a proxy object is that conventional techniques often fail to handle the situation of an artist-authored object that is made up one two or more sub-objects. When an artist creates a polygonal mesh that forms an object, the object is often composed of two or more sub-objects. The sub-objects that form the broader object, however, are often disconnected from one another and do not exactly enclose a volume. Instead, the sub-objects are merely authored such that the sub-objects overlap or are near other sub-objects, such that when the sub-objects are viewed as a whole, they define the broader object. Conventional approaches for generating a proxy object for an artist-authored object comprising multiple sub-objects often introduce artifacts into the proxy object due to the disconnected and imperfect arrangement of the sub-objects with one another.

As such, there remains a need in the art for an improved system and method for generating a proxy object of an artist-authored object that is made up of multiple sub-objects, such as, for example, disconnected sub-objects.

SUMMARY

Embodiments of the disclosure provide a method, device, and computer-readable storage medium for generating a proxy mesh. The method includes: receiving an input polygonal mesh that includes multiple sub-meshes, wherein each sub-mesh is a polygonal mesh, and the input polygonal mesh is a computer representation of a three-dimensional (3D) object; generating a voxel volume representing the input polygonal mesh, wherein the voxel volume comprises voxels that approximates a shape of the 3D object represented by the input polygonal mesh, wherein a first set of voxels of the voxel volume includes voxels that are identified as boundary voxels that correspond to positions of polygons of the multiple sub-meshes of the input polygonal mesh; determining a grouping of two or more sub-meshes that together enclose one or more voxels of the voxel volume other than the voxels in the first set of voxels; and generating a proxy mesh corresponding to the input polygonal mesh based on the grouping of two or more sub-meshes.

In one aspect, generating the voxel volume comprises: identifying the boundary voxels that correspond to positions of the polygons of the multiple sub-meshes of the input polygonal mesh; performing a flood fill from outer edges of a voxel grid to locate voxels that can be reached from the outer edges of the voxel grid without passing through any of the boundary voxels; identifying the voxels that can be reached from the outer edges of the voxel grid without passing through any of the boundary voxels as outside voxels; and identifying any voxels that are not identified as the boundary voxels or the outside voxels as inside voxels, wherein the inside voxels are voxels that are enclosed by a volume corresponding to the boundary voxels.

In one aspect, determining the grouping of two or more sub-meshes comprises: identifying a second set of voxels that are enclosed by a volume corresponding to the first set of voxels; selecting a first sub-mesh among the multiple sub-meshes; removing voxels corresponding to positions of polygons of the first sub-mesh from the first set of voxels to generate a third set of voxels; identifying a fourth set of voxels that are enclosed by a volume corresponding to the third set of voxels; comparing the fourth set of voxels to the second set of voxels; and determining whether to include the first sub-mesh in the grouping of two or more sub-meshes based on results of comparing the fourth set of voxels to the second set of voxels.

In one aspect, determining whether to include the first sub-mesh in the grouping of two or more sub-meshes comprises determining, for the first sub-mesh, a set of conditionally inside voxels that are included in the second set of voxels and not included in the fourth set of voxels.

In one aspect, in response to the set of conditionally inside voxels being a null set, the method includes determining not to include the first sub-mesh in the grouping of two or more sub-meshes.

In one aspect, in response to the set of conditionally inside voxels including one or more voxels and that none of the voxels in the set of conditionally inside voxels is associated with a group identifier, the method includes assigning all of the voxels in the set of conditionally inside voxels and the first sub-mesh to a first group identifier, wherein the first group identifier is a group identifier of the grouping of two or more sub-meshes.

In one aspect, in response to the set of conditionally inside voxels including one or more voxels and that at least one of the voxels in the set of conditionally inside voxels is associated with a group identifier, the method includes determining counts of voxels associated with different group identifiers; and assigning all of the voxels in the set of conditionally inside voxels and the first sub-mesh to a first group identifier, wherein the first group identifier is the group identifier associated with a largest count of voxels in the set of conditionally inside voxels, wherein the first group identifier is the group identifier of the grouping of two or more sub-meshes.

BRIEF DESCRIPTION OF THE DRAWINGS

FIG. 4A is a block diagram illustrating rendering of a scene, according to one embodiment.

FIG. 4B is an example of an image of a scene, according to one embodiment.

FIG. 8A is an example of a polygonal mesh corresponding to a chest object, according to one embodiment.

DETAILED DESCRIPTION

Figure 1:
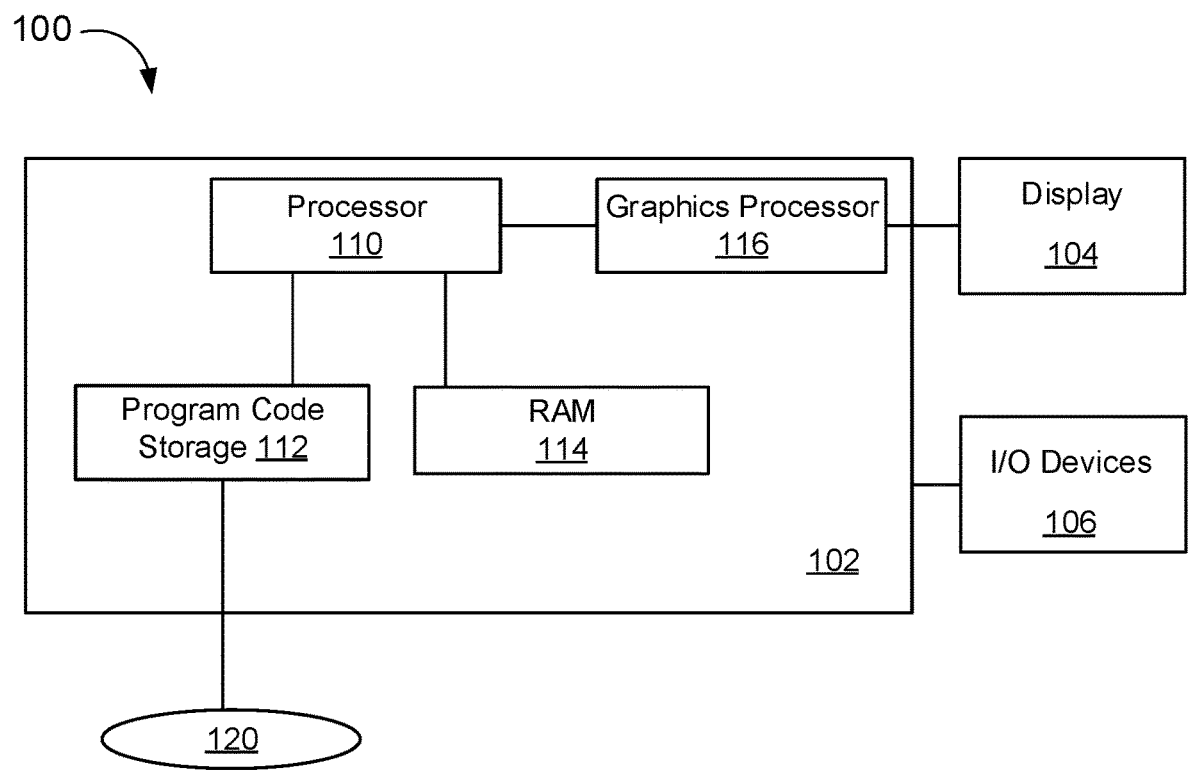
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

In conventional approaches, in the context of computer-generated objects represented as polygonal meshes, a proxy mesh for an artist-authored mesh can be made using Laplacian smoothing techniques. However, as described, these proxy meshes generated by Laplacian smoothing are often withered and/or oversimplified such that they lack any discernible detail and are poor representations of the original, artist-authored meshes, particularly when the artist-authored mesh is composed of multiple disconnected sub-meshes. In the context of video games, these issues with using Laplacian smoothing for creating proxy meshes introduce artifacts into the proxy mesh that can be noticeable to players, degrading the overall gameplay experience.

Embodiments of the disclosure provide a system and method for generating a proxy object of an artist-authored object that is made up of multiple sub-objects, such as disconnected sub-objects. A voxel volume is first generated that is representative of a polygonal mesh of an object received as input, where the polygonal mesh is made up of multiple sub-meshes. Each sub-mesh of the polygonal mesh is converted to a voxel boundary volume, where the voxels of the voxel boundary volume correspond to the surfaces of the sub-mesh. The multiple voxel boundary volumes corresponding to the multiple sub-meshes are then aggregated to form a combined voxel boundary volume that is representative of the overall shape of the polygonal mesh of the object. In some embodiments, the combined voxel boundary volume is "hollow" on the inside, as the combined voxel boundary volume merely represents the surfaces of the sub-meshes, which are themselves infinitely thin. The combined voxel boundary volume can then be filled to "fill" the voxels that are enclosed by the combined voxel boundary volume. The disclosed system and method then identify which sub-objects form groups that together enclose volume based on analyzing the filled combined voxel boundary volume, as described in greater detail below.

In some implementations, when generating a proxy object for an artist-authored object, there may be a polygon budget for the proxy object. In some cases, multiple proxy objects can be generated for the artist-authored object with different polygon budgets. As such, when generating the proxy object, it is often helpful to omit small details from the generated proxy object, preferring to spend the polygon budget for the proxy object on the larger, more discernible shapes of the artist-authored object, e.g., shapes that can be seen from a distance. According to the disclosed embodiments, when estimating the visual importance of a sub-mesh of an object, the volume of a 3D (three-dimensional) shape enclosed by that sub-mesh (i.e., alone or together with other sub-meshes) can be used as a metric for determining the visual importance of the sub-mesh, as compared to using metrics involving properties of the sub-mesh itself. In some cases, a sub-mesh taken individually may not enclose much volume, but when the sub-mesh is considered together as a group with one or more other sub-meshes, then the group of sub-meshes together may form a 3D shape that encloses relatively significant volume. This grouping information for the sub-meshes can then be used when generating the proxy object.

According to some disclosed embodiments, given a group of sub-meshes that together enclose a volume, it can be possible to add another sub-mesh to the group to create a larger group that still encloses volume. However, the disclosed embodiments are interested in determining minimal groups of sub-meshes that have the property that removing any sub-mesh from the group causes the group to no longer enclose volume. Conversely, if omitting a given sub-mesh from a group has the effect of reducing the volume enclosed by the group, the disclosed embodiments can determine that the sub-mesh should be included in the group.

Once minimal groupings of sub-meshes that together define volume are identified using the systems and methods disclosed herein, a proxy object can be created based on the sub-meshes in the group, ignoring the other sub-meshes of the artist-authored object. Various techniques can be used to generate the proxy object once the determination of which sub-meshes to include in the proxy object is made. For example, a voxel volume can be created from the sub-meshes in the group, where a polygonal mesh defining the proxy object can be formed based on the voxel volume created from the sub-meshes in the group. In another example, the sub-meshes could be merged together to form a combined mesh that excludes other sub-meshes that are not in the group, where a proxy object is generated based on the combined mesh.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

In some cases, an artist-authored object that is visible in a scene can be composed of multiple sub-objects, each of which can be quite complex and include many surfaces. For example, for an object represented as a polygonal mesh, the object may be composed of a set of polygonal sub-meshes that form the complete object. As described herein, one technique for reducing the computational complexity of an operation involving an artist-authored object is to perform the operation using a "proxy object" for the artist-authored object. A proxy object may be a simpler object (e.g., a simpler polygonal mesh) made to look like the artist-authored object. The proxy object can be used as a stand-in for the artist-authored object for performing operations involving the artist-authored object to reduce computational complexity, such as, for example, when the artist-authored object is only visible from far away from a camera location. In some implementations, the full resolution artist-authored object may not be needed, and so there are circumstances in which a lower resolution, simplified object like the proxy object is more appropriate in order to reduce the resource cost.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
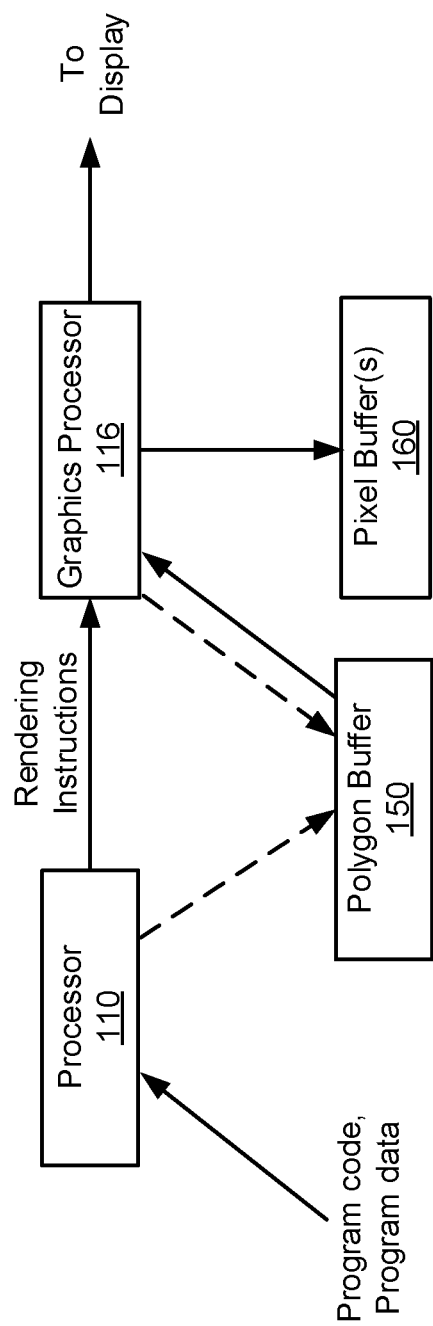
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
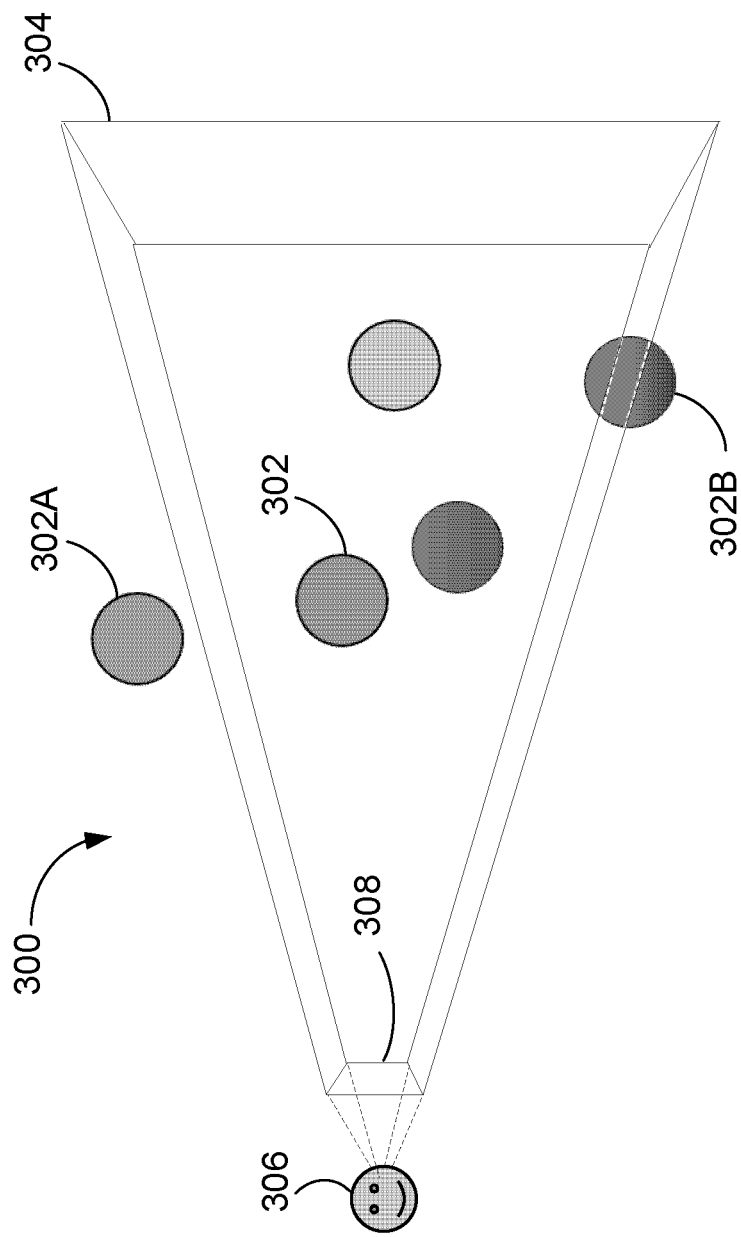
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
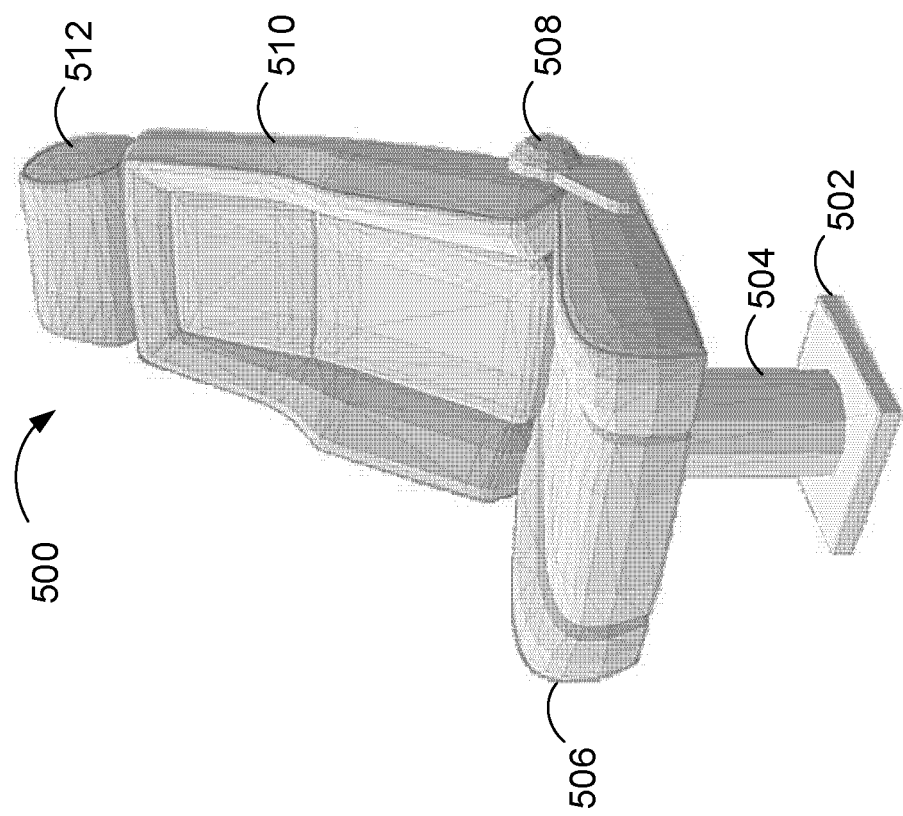
FIG. 5 is an example of a polygonal mesh, according to one embodiment.

FIG. 5 is an example of a polygonal mesh 500, according to one embodiment. As described, the polygonal mesh 500 may correspond to an artist-authored object. In the example shown, the object represents a chair. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

In various embodiments, the polygonal mesh 500 may be comprised of one or more polygonal sub-meshes. Each sub-mesh may include a series of polygons. In the example shown in FIG. 5, the polygonal mesh is comprised of multiple sub-meshes 502, 504, 506, 508, 510, 512, where sub-mesh 502 represents a chair base, sub-mesh 504 represents a chair post, sub-mesh 506 represents a chair seat, sub-mesh 508 represents a chair handle, sub-mesh 510 represents a chair back, and sub-mesh 512 represents a chair headrest.

As described above, a proxy object can be generated that represents the polygonal mesh 500 to be used in operations to reduce the computational complexity of the operations.

Figure 6:
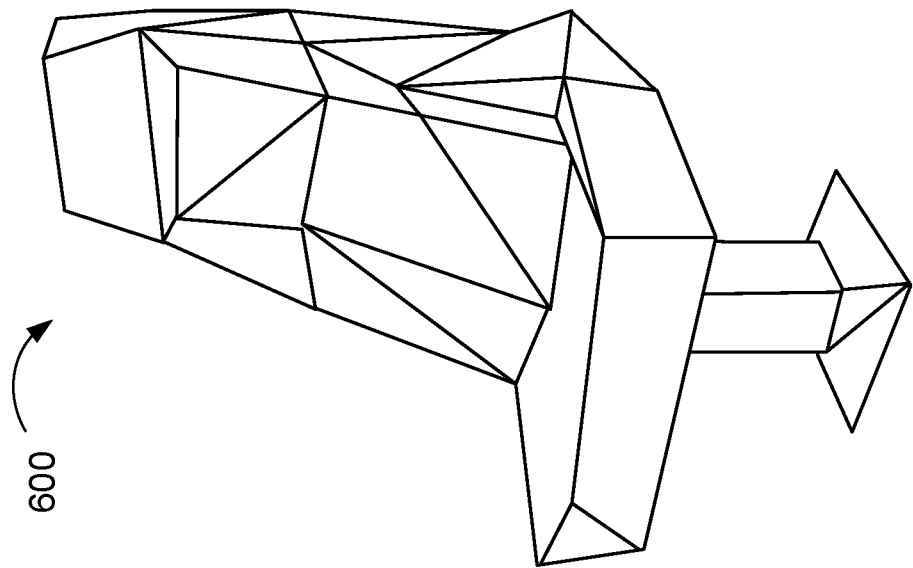
FIG. 6 is an example of a proxy mesh corresponding to the polygonal mesh in FIG. 5, according to one embodiment.

FIG. 6 is an example of a proxy mesh 600 corresponding to the polygonal mesh 500 in FIG. 5, according to one embodiment. As shown, the proxy mesh 600 is a polygonal mesh that includes a smaller number of faces, edges, and vertices compared to the polygonal mesh 500 in FIG. 5. The proxy mesh 600 can be used for graphics operations, such as rendering operations, to reduce a resource cost, where, for the case of mesh simplification, a smaller number of polygons in the mesh corresponds to a smaller resource cost. Using proxy mesh 600 for graphics operations allows the polygonal mesh corresponding to the proxy mesh 600 to be stored using less space and may allow a computing device to render the polygonal mesh more easily and may allow a computing device to use fewer computing resources (e.g., using less processing power, less memory, etc.) when rendering the polygonal mesh. As a result, the proxy mesh 600 is less expensive to store, process, render, etc. As used herein, the term "resource cost" is used to refer to the cost of computing resources in terms of storage, processing, rendering, etc.

In some implementations, the disclosed system and method for generating a proxy object, such as the proxy mesh 600 shown in FIG. 6, includes two phases. In a first phase, embodiments of the disclosure generate a combined boundary voxel volume that corresponds to the shape of polygonal mesh received as input, where the combined boundary voxel volume is comprised of multiple voxel boundary volumes. Each voxel boundary volume of the multiple voxel boundary volumes corresponds to a different sub-mesh of the polygonal mesh received as input. The combined voxel boundary volume can be "filled" to include the voxels that are enclosed by the combined voxel boundary volume.

In a second phase, groupings of one or more sub-meshes that enclose volume are identified based on the combined voxel boundary volume. A proxy object can then be generated for the polygonal mesh based on the groupings of one or more sub-meshes. The two phases are described in greater detail below.

Figure 7:
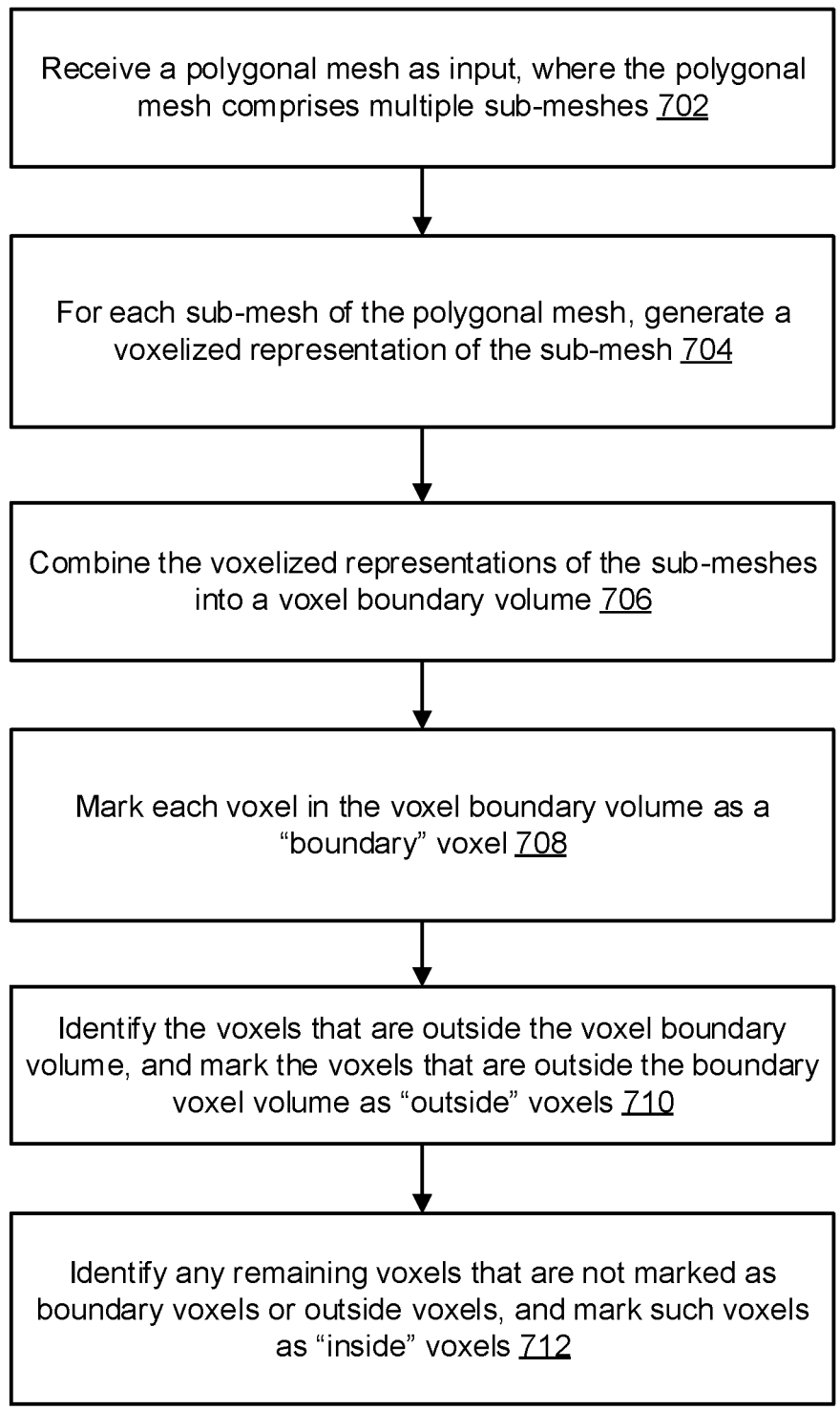
FIG. 7 is a flow diagram of method steps of generating a voxel volume representing a polygonal mesh, according to one embodiment.

FIG. 7 is a flow diagram of method steps of generating a voxel volume representing a polygonal mesh, according to one embodiment. In various implementations, the method can be performed by the processor 110, the graphics processor 116, or a combination of the processor 110 and the graphics processor 116. The flow diagram in FIG. 7, in one implementation, represents the first phase of generating the proxy object referenced above.

As shown, the method begins at step 702, where the processor receives a polygonal mesh as input, where the polygonal mesh comprises multiple sub-meshes. As described, the polygonal mesh may be an artist-authored object formed by multiple sub-objects or, more particularly, multiple sub-meshes. FIG. 8A is an example of a polygonal mesh 800 corresponding to a chest object, according to one embodiment. The polygonal mesh 800 is comprised of a series of polygons, e.g., triangles.

As shown in FIG. 8A, the chest object corresponding to the polygonal mesh 800 is comprised of multiple sub-meshes, including separate sub-meshes for a base 802, a lid 804, a handle 806, and a latch 808. Each of the sub-meshes is also a polygonal mesh.

Figure 8B:
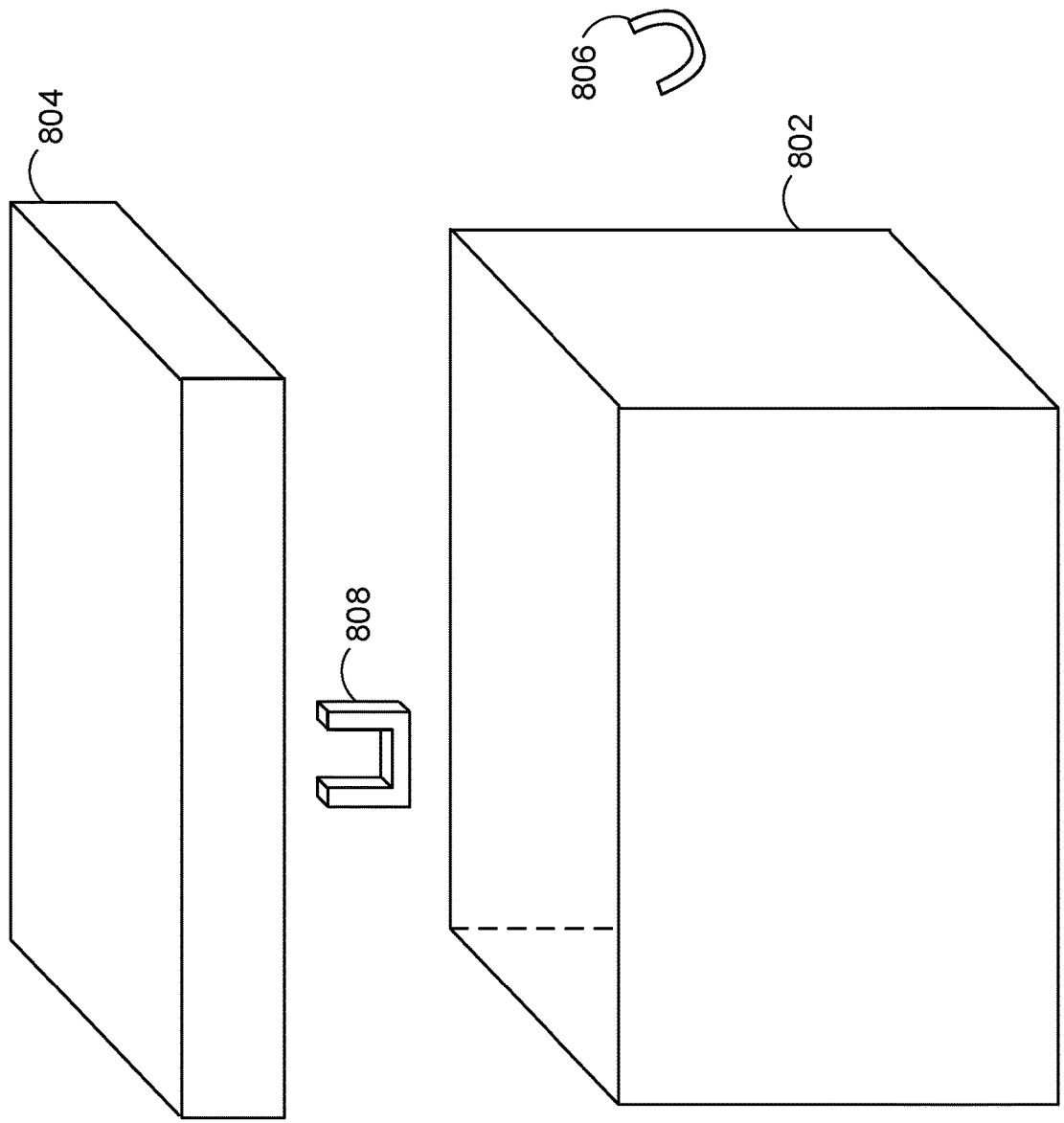
FIG. 8B is an exploded view of the object defined by the polygonal mesh shown in FIG. 8A, according to one embodiment.

FIG. 8B is an exploded view of the object defined by the polygonal mesh 800 shown in FIG. 8A, according to one embodiment. The multiple sub-objects (i.e., sub-meshes) are shown in FIG. 8B, including the base 802, the lid 804, the handle 806, and the latch 808. Also shown in FIG. 8B is a second handle 810 that is not visible in the perspective view shown in FIG. 8A, as the second handle 810 is occluded by the base 802 in FIG. 8A.

In some embodiments, the smaller sub-objects, such as the handles 806, 810 and latch 808 are not actually connected topologically to the base 802. Instead, they are left as completely disconnected sub-meshes that merely are near, touch, or overlap the sub-mesh representing the base 802. Note that the base 802 and lid 804 sub-meshes, which together describe the main solid shape of the chest, may not be roughly closed themselves, but are likely to be roughly closed when considered together (i.e., together the base 802 and lid 804 enclose volume). As used herein, although disconnected sub-meshes considered together may not be strictly closed in the topological sense (i.e., they do not strictly enclose volume), the disconnected sub-meshes may be considered roughly closed in the sense that their voxelizations bound volume. In other words, any small gaps in the disconnected sub-meshes are small enough to be resolved by voxelization.

According to embodiments of the disclosure, although artist-authored meshes (e.g., polygonal mesh 800) typically model solid 3D objects with enclosed volume, the meshes themselves are only surfaces. In other words, a polygonal mesh and its corresponding sub-meshes are simply collections of polygonal face elements connected together in some manner, such as at their edges or vertices. Such a mesh description has no volume of its own. Still, artists use polygonal meshes to model 3D shapes by using meshes to describe the surfaces, or boundaries, of the shapes. As such, complex artist-authored objects are often constructed from many separate parts, with some 3D shapes outlined only by several disconnected sub-meshes that are essentially pieces of a larger shape.

Referring back to FIG. 7, at step 704, for each sub-mesh of the polygonal mesh, the processor generates a voxelized representation of the sub-mesh. In three-dimensional (3D) computer graphics, a voxel represents a value on a regular grid in 3D space.

In one embodiment, the voxelized representation is fitted to the axial bounds of the input polygonal mesh. In this embodiment, voxels are added to the voxelized representation at coordinates that overlap the polygons of the input polygonal mesh. In other embodiments, voxels are added to the voxelized representation at coordinates that are just inside or just outside the polygons of the input polygonal mesh.

In various embodiments, the size and/or shape of the voxels of the voxelized representation are customizable. In some examples, the voxels are cubes, but in other embodiments, the voxels may have a rectangular or other shape. Also, the size (i.e., resolution) of the voxels can be customizable.

Some embodiments of the disclosure also provide an optional pre-processing step after step 702, but before step 704. It is noted that, in some embodiments, the input polygonal mesh may be intended to enclose a volume, but may not actually define a closed volume itself. In some artist-authored meshes, if the object is located along a base surface of world space coordinates or if it is positioned against another object, then parts of the polygonal mesh may simply not be authored for simplicity. As an example, for a polygonal mesh of a house object, the input polygonal mesh may comprise polygons defining four walls and a roof, but there may be no polygons that define a bottom surface (or floor) of the polygonal mesh of the house object, which is otherwise already constrained by the base surface of world space coordinates of a scene.

In some embodiments, pre-processing of the input polygonal mesh fills gaps in the polygonal mesh according to certain criteria to generate a volumetric polygonal mesh. In the case of polygonal mesh that is intended to enclose volume, but one or more surfaces are missing for simplicity of the object (e.g., such as a polygonal mesh of a house object that includes four sides and a roof, but no floor, as described above), polygons are first added to the polygonal mesh to enclose the volume, as was intended by the author. There may also be other small gaps in the polygonal mesh, if, for example, the polygonal mesh comprises of a set of sub-meshes that do not perfectly create closed volume. Pre-processing of the polygonal mesh, either directly by the author creating additional surfaces, or automatically by the processor based on certain criteria (e.g., the object is positioned against the base surface of world space coordinates of a scene) may be performed in some embodiments. In other embodiments, no additional pre-processing of the polygonal mesh is performed.

At step 706, the processor combines the voxelized representations of the sub-meshes into a voxel boundary volume. At step 708, the processor marks each voxel in the voxel boundary volume as a "boundary" voxel.

Figure 9A:
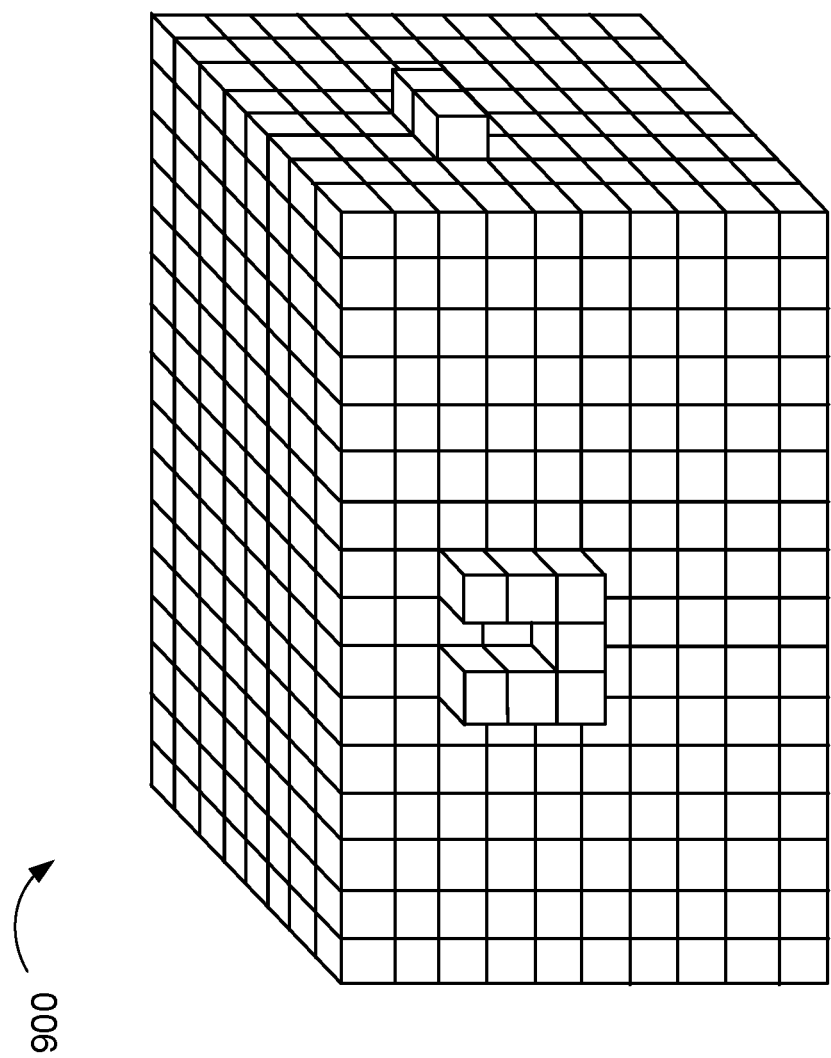
FIG. 9A is an example of a voxel boundary volume of the polygonal mesh in FIG. 8A, according to one embodiment.

FIG. 9A is an example of a voxel boundary volume 900 of the polygonal mesh 800 in FIG. 8A, according to one embodiment. As shown in FIG. 9A, the voxel boundary volume 900 is comprised of a series of voxels (e.g., cubes) that approximate the shape of the polygonal mesh 800, or more particularly, the combined shape of the multiple sub-meshes of the polygonal mesh. It is noted that, in some embodiments, the voxel boundary volume 900 is "hollow" on the inside, and merely includes voxels that approximate the locations of the polygons of the sub-meshes of the polygonal mesh 800, which itself can be infinitely thin and comprises a series of polygonal surfaces and so also "hollow" on the inside.

In some embodiments, a particular voxel in the voxel boundary volume 900 may correspond to two or more different sub-meshes of the polygonal mesh. In some embodiments, such boundary voxels can be further marked as "multiple boundary" voxels. Identifying which voxels correspond to two or more different sub-meshes, i.e., the "multiple boundary" voxels, can be used in later processing steps, as described in greater detail below.

Figure 9B:
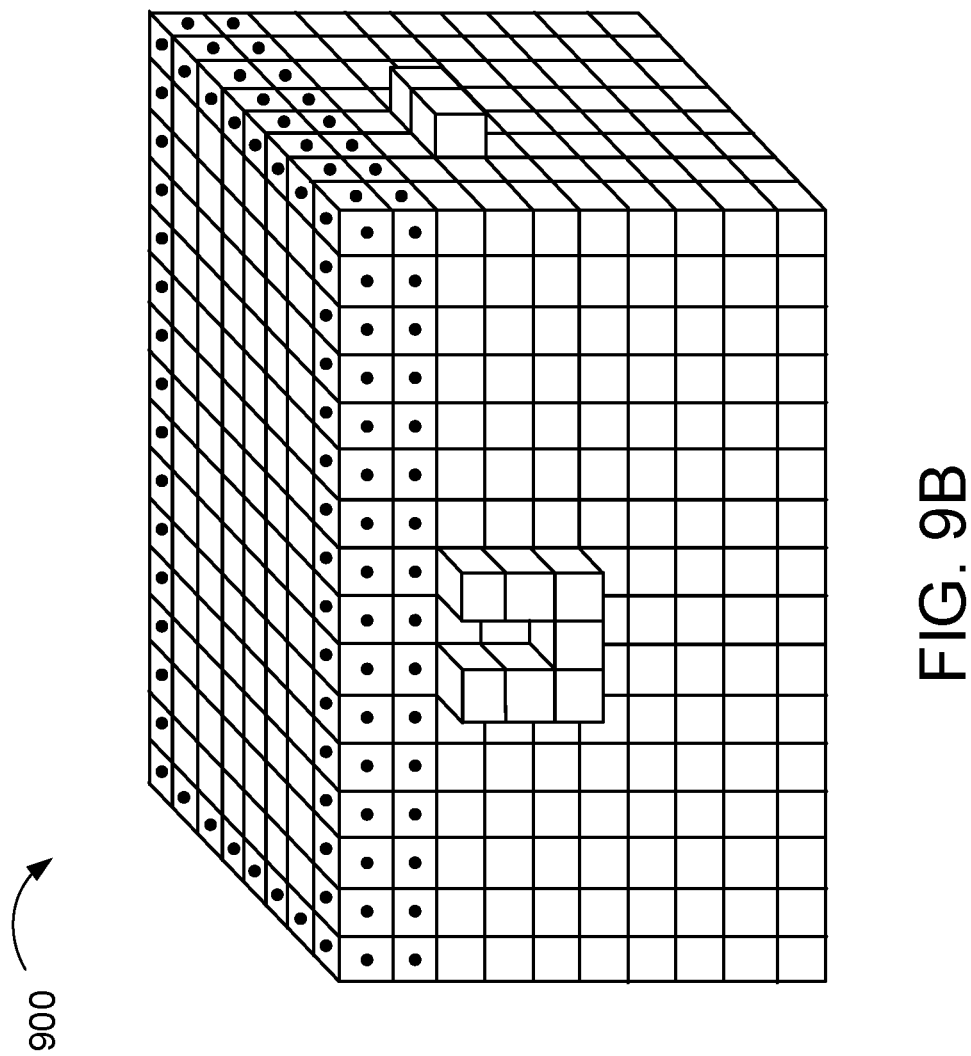
FIG. 9B is an example of the voxel boundary volume shown in FIG. 9A, with multiple boundary voxels marked with dots, according to one embodiment.

FIG. 9B is an example of the voxel boundary volume 900 shown in FIG. 9A, with multiple boundary voxels marked with dots, according to one embodiment. In the example shown in FIG. 9B, the multiple boundary voxels marked with dots are based on the sub-meshes of the base 802 and lid 804. The voxels marked with dots in FIG. 9B correspond to locations where the sub-mesh for the base 802 and the sub-mesh for the lid 804 overlap to correspond to the same voxels in the voxel boundary volume 900.

Referring back to FIG. 7, at step 710, the processor identifies voxels that are outside the voxel boundary volume 900, and marks the voxels that are outside the voxel boundary volume 900 as "outside" voxels. In one embodiment, identifying the voxels that are outside the voxel boundary volume 900 is based on performing a flood fill from outer edges of a voxel grid to locate the voxels that can be reached from the outer edges of the voxel grid without passing through any voxels marked as "boundary" voxels. In some embodiments, preforming the flood fill to identify the "outside" voxels is adjusted so that it does not fill "upwards" below a certain threshold height and within the voxel boundary volume. In one implementation, the threshold height is notionally a ground level (e.g., a base surface of world space coordinates). In another implementation, the threshold height can be assigned as a factor of the model height (for example, $\frac{1}{25}^{th}$ of the model height, although other factors can also be used). Then, during the flood fill operation starting from the outer edges of a voxel grid, where normally we would identify voxels as "outside" in all directions from the outer edges of a voxel grid (i.e., marching voxels above and below, to the left and right, to the front and back, and optionally also in the diagonal directions), some embodiments instead suppress the flood fill in the upward directions (i.e., upwards, and/or all upward diagonal directions). This suppression is only enforced at voxels at the threshold height, e.g., ground level or below, and within the voxel boundary volume. The effect of this suppression of the flood fill is to prevent the flood fill from entering any downward-facing openings at the bottom of the model. This embodiment of adjusting the flood fill is intended to assist with the situation where the input polygonal mesh may be intended to enclose a volume, but may not actually define a closed volume itself, e.g., a polygonal mesh of a house object, wherein the input polygonal mesh may comprise polygons defining four walls and a roof, but there may be no polygons that define a bottom surface (or floor) of the polygonal mesh of the house object, which is otherwise already constrained by the base surface of world space coordinates of a scene.

Figure 10:
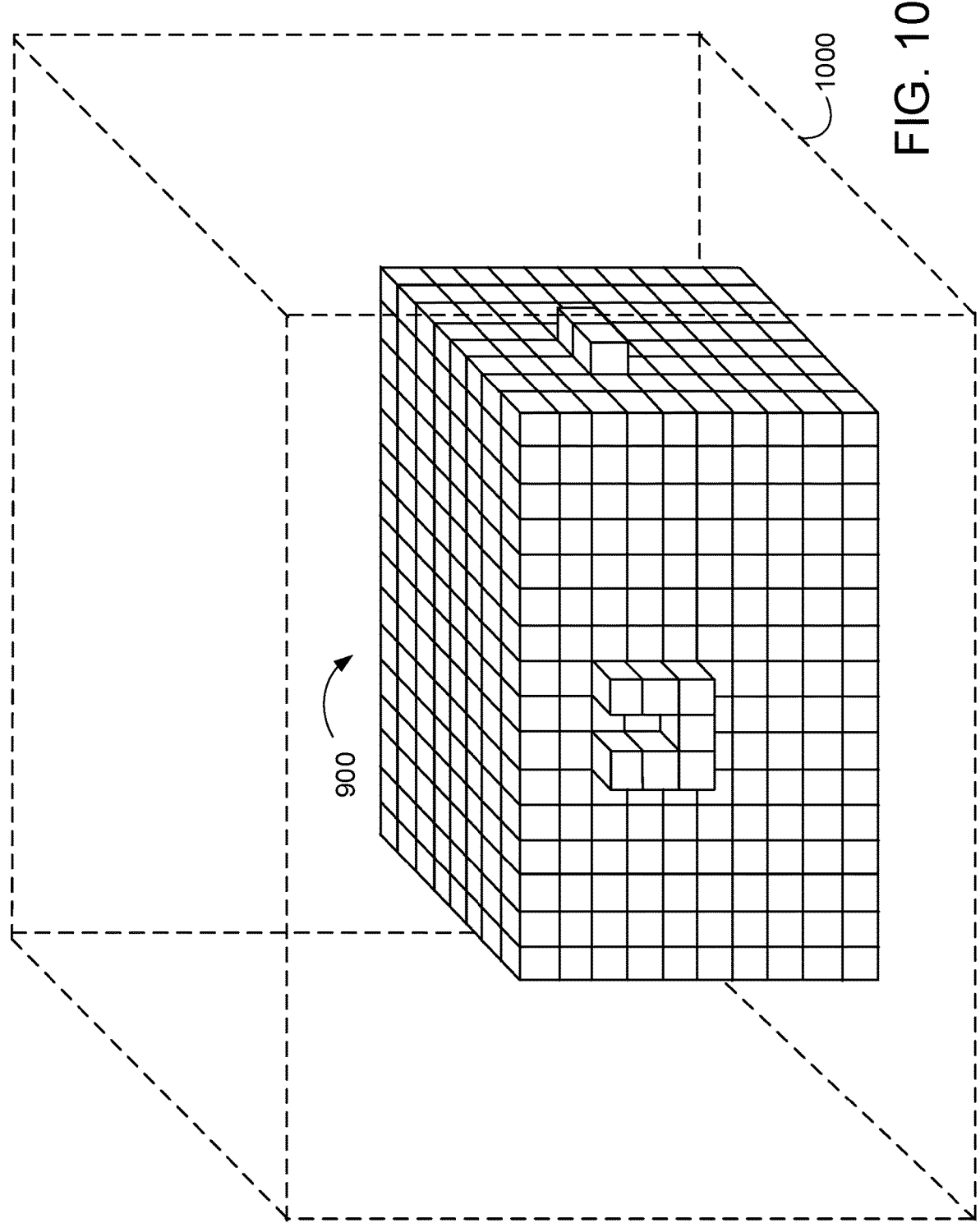
FIG. 10 is an example of a voxel boundary volume and a voxel grid, according to one embodiment.

FIG. 10 is an example of a voxel boundary volume 900 and a voxel grid 1000, according to one embodiment. As described previously, the voxel boundary volume 900 includes just those voxels that correspond to the surfaces of the sub-meshes of the polygonal mesh received as input. As such, the voxel boundary volume 900 is "hollow" on the inside, as the voxel boundary volume 900 merely approximates the locations of the polygons of the polygonal sub-meshes, which themselves define a shape that is "hollow" on the inside.

The voxel grid 1000 represents a coordinate system for the voxels of the voxel boundary volume 900 and comprises an upper bound on the dimensions of the voxel boundary volume 900. In various embodiments, the voxel grid 1000 is sized so that the voxel grid 1000 can fully encompass all the voxels of the voxel boundary volume 900. In one embodiment, to identify the voxels that are "outside" the voxel boundary volume 900, a flood fill can be performed. When performing a flood fill, in one implementation, voxel marching is performed inward towards the voxel boundary volume 900 starting from the outer edges of the voxel grid 1000. Any voxels that can be reached during this flood fill operation are marked as voxels within the voxel grid 1000 that are "outside" the voxel boundary volume 900.

At step 712, the processor identifies any remaining voxels (i.e., within the voxel grid 1000) that are not marked as "boundary" voxels or "outside" voxels, and marks such voxels as "inside" voxels. As previously described, the voxel boundary volume 900 is "hollow" on the side, as the voxel boundary volume 900 merely approximates the locations of the polygons of the sub-meshes. Once the "outside" voxels are identified at step 710, any voxels that are not marked as "boundary" voxels or "outside" voxels are therefore "inside" voxels, i.e., voxels that are inside the volume enclosed by the "boundary" voxels. In another embodiment, other techniques can be used to identify which voxels are "inside" voxels that inside the volume enclosed by the "boundary" voxels. After step 712 is completed, a "voxel volume" for the polygonal mesh has been generated, where the voxels of the voxel volume are marked as either "boundary" voxels, "outside" voxels, or "inside" voxels.

In other implementations, just the "boundary" voxels and the "inside" voxels are identified, and the set of "outside" voxels is not directly computed, although it would be implicit from identifying the "boundary" voxels and the "inside" voxels.

In some embodiments, after completing the first phase for generating the proxy object (e.g., as described in FIG. 7), a voxel volume has been generated that represents the polygonal mesh received as input. The voxel volume for the polygonal mesh includes voxels that are marked as either "boundary" voxels, "outside" voxels, or "inside" voxels. In a second phase for generating the proxy object, according to some embodiments, groupings of sub-objects that together enclose volume are identified based on the voxel volume.

Figure 11:
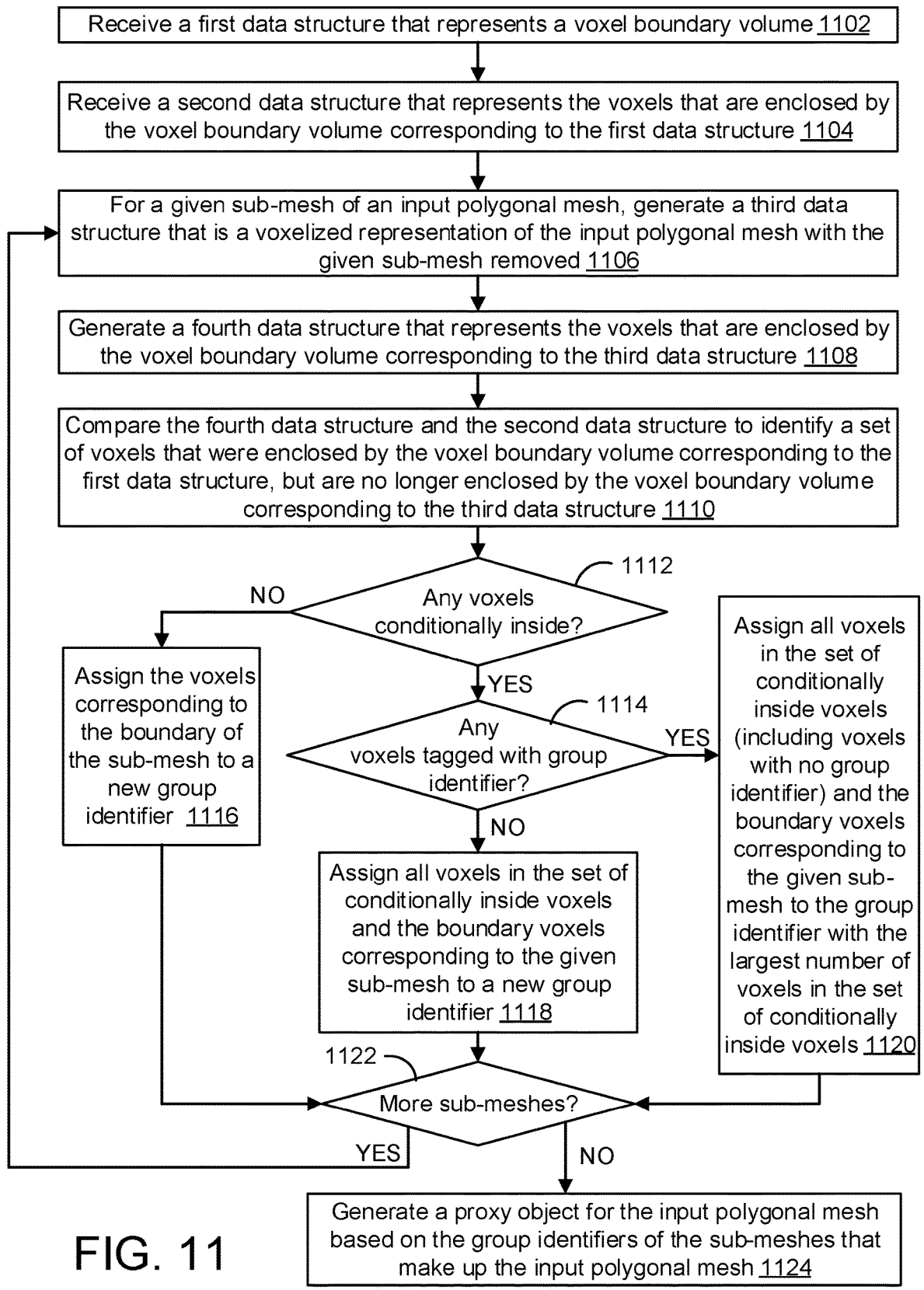
FIG. 11 is a flow diagram of method steps for identify groupings of sub-objects that together enclose volume based on a voxel volume, according to one embodiment.

FIG. 11 is a flow diagram of method steps for identify groupings of sub-objects that together enclose volume based on a voxel volume, according to one embodiment. In various implementations, the method can be performed by the processor 110, the graphics processor 116, or a combination of the processor 110 and the graphics processor 116. The flow diagram in FIG. 11, in one implementation, represents the second phase of generating the proxy object referenced above.

At step 1102, the processor receives a first data structure that represents a voxel boundary volume, such as voxel boundary volume 900 in FIG. 9A. In one embodiment, as described in the flow diagram of FIG. 7, a voxel volume can be generated for a polygonal mesh, where the voxels are marked as "boundary" voxels, "outside" voxels, or "inside" voxels. The first data structure that represents a voxel boundary volume includes the voxels that are marked as "boundary" voxels, but does not include the voxels are marked as "outside" voxels or "inside" voxels.

At step 1104, the processor receives a second data structure that represents the voxels that are enclosed by the voxel boundary volume corresponding to the first data structure. In one implementation, the second data structure includes the voxels that are marked as "boundary" voxels and "inside" voxels, but does not include the voxels are marked as "outside" voxels. In some cases, the voxels of the first data structure and the second data structure may be same, i.e., in the case where all sub-meshes of the input polygonal mesh are represented in the voxel boundary volume and no additional voxels are marked as "inside" voxels.

At step 1106, for a given sub-mesh of an input polygonal mesh, the processor generates a third data structure that is a voxelized representation of the input polygonal mesh with the given sub-mesh removed. In one implementation, the voxelized representation of the third data structure is itself a "voxel boundary volume" similar to the voxel boundary volume corresponding to the first data structure, but in the voxelized representation of the third data structure, the voxels that correspond to the given sub-mesh (i.e., the "boundary" voxels corresponding to the given sub-mesh) are removed from the voxelized representation. In some embodiments, if certain voxels that correspond to the given sub-mesh are voxels that also correspond to another sub-mesh (i.e., so-called "multiple boundary" voxels, as discussed above at step 708 in FIG. 7, for example), then such voxels are retained in the third data structure and are not removed. In such an embodiment, only those voxels that correspond to the given sub-mesh and no other sub-meshes are not included in the third data structure.

Figure 12:
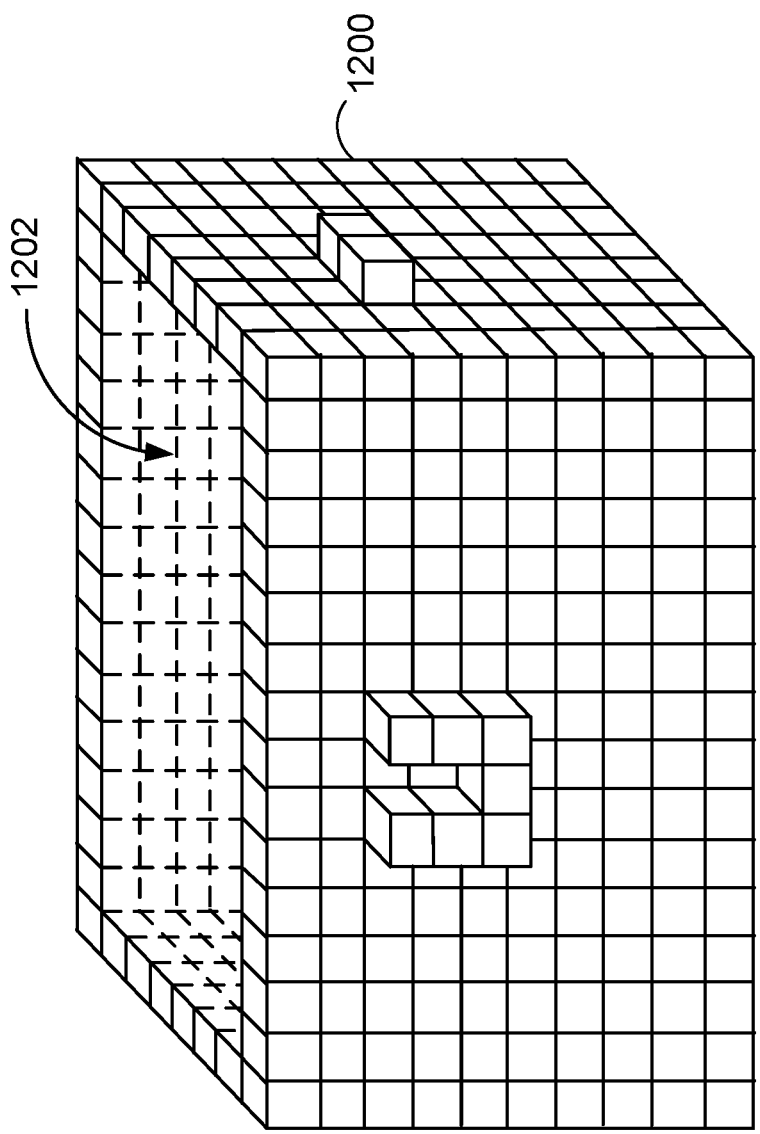
FIG. 12 is an example of a voxelized representation of the input polygonal mesh in FIG. 8A with the sub-mesh for the lid removed, according to one embodiment.

FIG. 12 is an example of a voxelized representation 1200 of the input polygonal mesh in FIG. 8A with the sub-mesh for the lid 804 removed, according to one embodiment. In one implementation, FIG. 12 shows an example of the "third data structure" that is a voxelized representation of the input polygonal mesh with a given sub-mesh (i.e., the sub-mesh corresponding to the lid 804) removed. As shown in FIG. 12, the voxelized representation 1200 is a "voxel boundary volume" that includes the voxels of the various sub-meshes of the input polygonal mesh, but the voxels corresponding to sub-mesh for the lid 804 are not included in the voxelized representation 1200. As a result of not including the voxels corresponding to the sub-mesh for the lid 804, there is an opening 1202 in the voxelized representation 1200 shown in FIG. 12. Thus, voxels that were previously enclosed by the voxel boundary volume before the voxels corresponding to the sub-mesh for the lid 804 were removed (i.e., enclosed by the voxel boundary volume corresponding to the first data structure) are no longer enclosed. For a given sub-mesh "i", the voxels that were previously identified as "inside" voxels in the voxel volume for the complete input polygonal mesh, but are no longer enclosed by the third data structure that is a voxelized representation of the input polygonal mesh with the given sub-mesh "i" removed are referred to herein as "conditionally inside" voxels. Taking the sub-mesh for the lid 804 as an example, all the voxels that would be considered "inside" voxels in the second data structure (i.e., that includes voxels for all sub-meshes), but are no longer enclosed by the voxel boundary volume once the voxel for the sub-mesh for the lid 804 are removed, are "conditionally inside" voxels corresponding to the sub-mesh for the lid 804.

Referring back to FIG. 11, at step 1108, the processor generates a fourth data structure that represents the voxels that are enclosed by the voxel boundary volume corresponding to the third data structure. Step 1108 identifies which voxels are "conditionally" inside voxels for the given sub-mesh, i.e., identifies the voxels that would be considered "inside" voxels in the second data structure (i.e., that includes voxels for all sub-meshes), but are no longer enclosed by the voxels of the third data structure that is a voxelized representation of the input polygonal mesh with the given sub-mesh removed. In one embodiment, performing step 1108 is similar to performing steps 710 and 712 in FIG. 7, where for a given voxel boundary volume (i.e., the voxels of the third data structure identified at step 1106), first the voxels that are "outside" the given voxel boundary volume are identified, and then the voxels that are "conditionally inside" voxels are identified as those that are not "boundary" voxels of the given voxel boundary volume or "outside" voxels.

At step 1110, the processor compares the fourth data structure and the second data structure to identify a set of conditionally inside voxels that were enclosed by the voxel boundary volume corresponding to the first data structure, but are no longer enclosed by the voxel boundary volume corresponding to the third data structure. The result of the comparison at step 1110 reveals one of three possibilities: (1) the set of conditionally inside voxels is null, (2) the set of conditionally inside voxels is not null and none of the conditionally inside voxels are tagged with a group identifier, or (3) the set of conditionally inside voxels is not null and one or more of the conditionally inside voxels are tagged with a group identifier.

At step 1112, the processor determines whether there are any voxels in the set of conditionally inside voxels. In other words, the processor determines whether the set of conditionally inside voxels is a null set or not. A null set of conditionally inside voxels would occur when removing the boundary voxels corresponding to the given sub-mesh does not result in any conditionally inside voxels. In such a case, it can thus be determined that the given sub-mesh does not contribute to enclosing any significant volume.

If the processor determines, at step 1112, that there are no voxels in the set of conditionally inside voxels (i.e., the set of conditionally inside voxels is null), then the method proceed to step 1116, where the processor assigns the given sub-mesh a new group identifier. Group identifiers, as used herein, identify groups of one or more sub-meshes. In some implementations, the groups of one or more sub-meshes together enclose volume and can be used to generate proxy objects. In the case where there are no voxels in the set of conditionally inside voxels for a given sub-mesh, then the given sub-mesh is determined not to enclose volume, so it is assigned to a new group identifier, which will ultimately be a group of just one sub-mesh. In another embodiment, at step 1116, the processor assigns the boundary voxels that correspond to the given sub-mesh the new group identifier.

If the processor determines, at step 1112, that there are voxels in the set of conditionally inside voxels (i.e., the set of conditionally inside voxels is not null), then the method proceed to step 1114, where the processor determines whether any of the conditionally inside voxels are currently tagged with a group identifier. There would be no conditionally inside voxels tagged with a group identifier in a case where the given sub-mesh either encloses volume by itself or the given sub-mesh is the first sub-mesh identified of a newly found group of sub-meshes that together enclose volume.

If the processor determines, at step 1114, that none of the conditionally inside voxels are currently tagged with a group identifier, then the method proceeds to step 1118, where the processor assigns all voxels in the set of conditionally inside voxels and the given sub-mesh to a new group identifier. In another embodiment, at step 1118, the processor assigns all voxels in the set of conditionally inside voxels and the boundary voxels corresponding to the given sub-mesh to the new group identifier.

If the processor determines, at step 1114, that at least one of the conditionally inside voxels is currently tagged with a group identifier, then the method proceeds to step 1120, where the processor assigns all voxels in the set of conditionally inside voxels (including voxels with no group identifier) and the given sub-mesh to the group identifier with the largest number of voxels in the set of conditionally inside voxels. This represents the case where the given sub-mesh is a new sub-mesh to be added to a previously identified grouping of sub-meshes. In some embodiments, the possibility that some of the conditionally inside voxels are tagged with different group identifiers is possible because sometimes multiple possible groupings of sub-meshes are available. In one implementation, the disclosed method favors groupings that together enclose more volume. In another embodiment, at step 1120, the processor assigns all voxels in the set of conditionally inside voxels (including voxels with no group identifier) and the boundary voxels corresponding to the given sub-mesh to the group identifier with the largest number of voxels in the set of conditionally inside voxels.

From each of steps 1116, 1118, and 1120, the method proceeds to step 1122, where the processor determines whether there are any more sub-meshes of the input polygonal mesh left to process. If yes, the method returns to step 1106, where a different sub-mesh is selected and processed.

Once all of the sub-meshes have been processed according to FIG. 11 and have been organized into groupings of one or more sub-meshes, at step 1124, the processor generates a proxy object for the input polygonal mesh based on the group identifiers of the sub-meshes that make up the input polygonal mesh. Once the sub-meshes are assigned to groups, in one embodiment, the sub-meshes in each group are merged together into a single polygonal mesh (i.e., ignoring that the artist modelled them as separate sub-meshes). In another embodiment, the sub-meshes in each group are kept unmerged and the group identifiers are used in an assignment table to indicate a mapping of sub-meshes to groups. In either case, each group of sub-meshes is treated as a single mesh in subsequent operations that rely on building a volumetric representation of the 3D shape, such as a proxy object, described by the input polygonal mesh.

Some embodiments for generating proxy objects wish to omit small details from the generated proxy object, preferring to spend the triangle budget for the proxy object on the larger, more discernible shapes that can be seen from a distance. In the example of the chest in FIG. 8A, the sub-meshes for the base 802 and lid 804 are grouped together into a group. Some embodiments might choose to omit the sub-meshes for handle 806 and latch 808 (i.e., sub-meshes for sub-objects that are not in the group that includes the base 802 and the lid 804) in the proxy object, since the handle 806 and latch 808 are not visually significant when viewed from far away.

In one implementation, once a grouping of sub-meshes is identified, a voxel volume that includes just those sub-meshes is generated. The surfaces of the voxel volume can be extracted and combined to form a new polygonal mesh that is used for the proxy object. The proxy object based on the extracted surfaces of the voxel volume may be blocky, so this proxy object can be smoothed and simplified (for example, using traditional mesh simplification techniques) until it is a smooth, well-formed mesh with the same general shape as the voxel volume, but having a much lower triangle count.

In another implementation, once the groupings of sub-meshes that together form volume are identified, generating the proxy object can include replacing the sub-meshes in the group with simple bounding shapes, such as boxes or convex hulls. In the example of the chest in FIG. 8A, the base 802 and the lid 804 are included in a single group of sub-meshes (for example, using the method of FIG. 11). To generate the proxy object for the group that includes the base 802 and the lid 804, one implementation could fit a convex hull around the main shape described by the sub-meshes for the base 802 and the lid 804. A new, baked, texture can then be generated for the proxy object (i.e., for the convex hull that encompasses the base 802 and the lid 804), where colors of the texture colors have the original components of the polygonal mesh (i.e., the handle 806 and latch 808 in FIG. 8A) baked into the texture. This frees the proxy object from the need to represent separate parts with geometry (i.e., the geometry of certain sub-meshes is omitted from the proxy object), relying instead on their colors being represented in the texture.

In some embodiments, the groupings of sub-meshes identified by the method of FIG. 11 can vary depending on the order in which the sub-meshes are processed. In some embodiments, certain criteria can be used to set the order in which the sub-meshes are selected (i.e., at step 1106) for processing according to FIG. 11. For example, sub-meshes can be sorted based on the number of boundary voxels to which the sub-mesh corresponds.

In sum, embodiments of the disclosure provide systems and methods for volumetric handling of sub-meshes in complex artist-authored models of objects comprising many separate parts, i.e., sub-meshes. The disclosed embodiments allow us to reason about the relative visual importance of different parts based on the volume that the sub-mesh encloses, either individually or together with other sub-meshes. Although the disclosed embodiments are described in the context of proxy mesh generation, they are also applicable to a wide range of problems where an artist-authored model is to be understood with no prior information about the meaning or significance of different parts.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating a proxy mesh, the method comprising:

receiving, by one or more processors, an input polygonal mesh that includes multiple sub-meshes, wherein each sub-mesh is a polygonal mesh, and the input polygonal mesh is a computer representation of a three-dimensional (3D) object;

generating, by the one or more processors, a voxel volume representing the input polygonal mesh, wherein the voxel volume comprises voxels that approximates a shape of the 3D object represented by the input polygonal mesh, wherein a first set of voxels of the voxel volume includes voxels that are identified as boundary voxels that correspond to positions of polygons of the multiple sub-meshes of the input polygonal mesh;

determining, by the one or more processors, a grouping of two or more sub-meshes that together enclose space, wherein determining the grouping of two or more sub-meshes comprises:

determining that a first sub-mesh of the multiple sub-meshes is included in the grouping of the two or more sub-meshes based on determining that the first sub-mesh in combination with at least one other sub-mesh of the grouping of the two or more sub-meshes encloses one or more voxels of the voxel volume other than the voxels in the first set of voxels; and determining that a second sub-mesh of the multiple sub-meshes is not included in the grouping of the two or more sub-meshes based on determining that the second sub-mesh in combination with the sub-meshes of the grouping of the two or more sub-meshes does not enclose any voxels of the voxel volume other than the voxels in the first set of voxels; and generating, by the one or more processors, a proxy mesh corresponding to the input polygonal mesh based on the grouping of two or more sub-meshes.

2. The method according to claim 1, wherein generating the voxel volume comprises:

identifying the boundary voxels that correspond to positions of the polygons of the multiple sub-meshes of the input polygonal mesh;

performing a flood fill from outer edges of a voxel grid to locate voxels that can be reached from the outer edges of the voxel grid without passing through any of the boundary voxels;

identifying the voxels that can be reached from the outer edges of the voxel grid without passing through any of the boundary voxels as outside voxels; and identifying any voxels that are not identified as the boundary voxels or the outside voxels as inside voxels, wherein the inside voxels are voxels that are enclosed by a volume corresponding to the boundary voxels.

3. The method according to claim 1, wherein determining that the first sub-mesh of the multiple sub-meshes is included in the grouping of the two or more sub-meshes comprises:

identifying a second set of voxels that are enclosed by a volume corresponding to the first set of voxels;

removing voxels corresponding to positions of polygons of the first sub-mesh from the first set of voxels to generate a third set of voxels;

identifying a fourth set of voxels that are enclosed by a volume corresponding to the third set of voxels;

comparing the fourth set of voxels to the second set of voxels; and determining whether to include the first sub-mesh in the grouping of two or more sub-meshes based on results of comparing the fourth set of voxels to the second set of voxels.

4. The method according to claim 3, wherein determining whether to include the first sub-mesh in the grouping of two or more sub-meshes comprises:

determining, for the first sub-mesh, a set of conditionally inside voxels that are included in the second set of voxels and not included in the fourth set of voxels.

5. The method according to claim 4, further comprising:

in response to the set of conditionally inside voxels including one or more voxels and that none of the voxels in the set of conditionally inside voxels is associated with a group identifier, assigning all of the voxels in the set of conditionally inside voxels and the first sub-mesh to a first group identifier, wherein the first group identifier is a group identifier of the grouping of two or more sub-meshes.

6. The method according to claim 4, further comprising:

in response to the set of conditionally inside voxels including one or more voxels and that at least one of the voxels in the set of conditionally inside voxels is associated with a group identifier, determining counts of voxels associated with different group identifiers; and assigning all of the voxels in the set of conditionally inside voxels and the first sub-mesh to a first group identifier, wherein the first group identifier is the group identifier associated with a largest count of voxels in the set of conditionally inside voxels, wherein the first group identifier is the group identifier of the grouping of two or more sub-meshes.

7. The method according to claim 1, wherein determining that the second sub-mesh of the multiple sub-meshes is not included in the grouping of the two or more sub-meshes comprises:

identifying a second set of voxels that are enclosed by a volume corresponding to the first set of voxels;

removing voxels corresponding to positions of polygons of the second sub-mesh from the first set of voxels to generate a third set of voxels;

identifying a fourth set of voxels that are enclosed by a volume corresponding to the third set of voxels;

comparing the fourth set of voxels to the second set of voxels;

determining, for the second sub-mesh, a set of conditionally inside voxels that are included in the second set of voxels and not included in the fourth set of voxels; and in response to the set of conditionally inside voxels being a null set, determining not to include the second sub-mesh in the grouping of two or more sub-meshes.

8. A non-transitory computer-readable storage medium storing instructions that, when executed by one or more processors, causes a computing device to generate a proxy mesh, by performing the steps of:

receiving an input polygonal mesh that includes multiple sub-meshes, wherein each sub-mesh is a polygonal mesh, and the input polygonal mesh is a computer representation of a three-dimensional (3D) object;

generating a voxel volume representing the input polygonal mesh, wherein the voxel volume comprises voxels that approximates a shape of the 3D object represented by the input polygonal mesh, wherein a first set of voxels of the voxel volume includes voxels that are identified as boundary voxels that correspond to positions of polygons of the multiple sub-meshes of the input polygonal mesh;

determining a grouping of two or more sub-meshes that together enclose space, wherein determining the grouping of two or more sub-meshes comprises:

determining that a first sub-mesh of the multiple sub-meshes is included in the grouping of the two or more sub-meshes based on determining that the first sub-mesh in combination with at least one other sub-mesh of the grouping of the two or more sub-meshes encloses one or more voxels of the voxel volume other than the voxels in the first set of voxels; and determining that a second sub-mesh of the multiple sub-meshes is not included in the grouping of the two or more sub-meshes based on determining that the second sub-mesh in combination with the sub-meshes of the grouping of the two or more sub-meshes does not enclose any voxels of the voxel volume other than the voxels in the first set of voxels; and generating a proxy mesh corresponding to the input polygonal mesh based on the grouping of two or more sub-meshes.

9. The computer-readable storage medium according to claim 8, wherein generating the voxel volume comprises:

identifying the boundary voxels that correspond to positions of the polygons of the multiple sub-meshes of the input polygonal mesh;

performing a flood fill from outer edges of a voxel grid to locate voxels that can be reached from the outer edges of the voxel grid without passing through any of the boundary voxels;

identifying the voxels that can be reached from the outer edges of the voxel grid without passing through any of the boundary voxels as outside voxels; and identifying any voxels that are not identified as the boundary voxels or the outside voxels as inside voxels, wherein the inside voxels are voxels that are enclosed by a volume corresponding to the boundary voxels.

10. The computer-readable storage medium according to claim 8, wherein determining that the first sub-mesh of the multiple sub-meshes is included in the grouping of the two or more sub-meshes comprises:

identifying a second set of voxels that are enclosed by a volume corresponding to the first set of voxels;

removing voxels corresponding to positions of polygons of the first sub-mesh from the first set of voxels to generate a third set of voxels;

identifying a fourth set of voxels that are enclosed by a volume corresponding to the third set of voxels;

comparing the fourth set of voxels to the second set of voxels; and determining whether to include the first sub-mesh in the grouping of two or more sub-meshes based on results of comparing the fourth set of voxels to the second set of voxels.

11. The computer-readable storage medium according to claim 10, wherein determining whether to include the first sub-mesh in the grouping of two or more sub-meshes comprises:

determining, for the first sub-mesh, a set of conditionally inside voxels that are included in the second set of voxels and not included in the fourth set of voxels.

12. The computer-readable storage medium according to claim 11, further comprising:

in response to the set of conditionally inside voxels including one or more voxels and that none of the voxels in the set of conditionally inside voxels is associated with a group identifier, assigning all of the voxels in the set of conditionally inside voxels and the first sub-mesh to a first group identifier, wherein the first group identifier is a group identifier of the grouping of two or more sub-meshes.

13. The computer-readable storage medium according to claim 11, further comprising:

in response to the set of conditionally inside voxels including one or more voxels and that at least one of the voxels in the set of conditionally inside voxels is associated with a group identifier, determining counts of voxels associated with different group identifiers; and assigning all of the voxels in the set of conditionally inside voxels and the first sub-mesh to a first group identifier, wherein the first group identifier is the group identifier associated with a largest count of voxels in the set of conditionally inside voxels, wherein the first group identifier is the group identifier of the grouping of two or more sub-meshes.

14. The computer-readable storage medium according to claim 8, wherein determining that the second sub-mesh of the multiple sub-meshes is not included in the grouping of the two or more sub-meshes comprises:

identifying a second set of voxels that are enclosed by a volume corresponding to the first set of voxels;

removing voxels corresponding to positions of polygons of the second sub-mesh from the first set of voxels to generate a third set of voxels;

identifying a fourth set of voxels that are enclosed by a volume corresponding to the third set of voxels;

comparing the fourth set of voxels to the second set of voxels;

determining, for the second sub-mesh, a set of conditionally inside voxels that are included in the second set of voxels and not included in the fourth set of voxels; and in response to the set of conditionally inside voxels being a null set, determining not to include the second sub-mesh in the grouping of two or more sub-meshes.

15. A device for generating a proxy mesh, the device comprising:

a memory storing instructions; and one or more processors configured to the execute the instructions to cause the device to:

receive an input polygonal mesh that includes multiple sub-meshes, wherein each sub-mesh is a polygonal mesh, and the input polygonal mesh is a computer representation of a three-dimensional (3D) object;

generate a voxel volume representing the input polygonal mesh, wherein the voxel volume comprises voxels that approximates a shape of the 3D object represented by the input polygonal mesh, wherein a first set of voxels of the voxel volume includes voxels that are identified as boundary voxels that correspond to positions of polygons of the multiple sub-meshes of the input polygonal mesh;

determine a grouping of two or more sub-meshes that together enclose space, wherein determining the grouping of two or more sub-meshes comprises:

determining that a first sub-mesh of the multiple sub-meshes is included in the grouping of the two or more sub-meshes based on determining that the first sub-mesh in combination with at least one other sub-mesh of the grouping of the two or more sub-meshes encloses one or more voxels of the voxel volume other than the voxels in the first set of voxels; and determining that a second sub-mesh of the multiple sub-meshes is not included in the grouping of the two or more sub-meshes based on determining that the second sub-mesh in combination with the sub-meshes of the grouping of the two or more sub-meshes does not enclose any voxels of the voxel volume other than the voxels in the first set of voxels; and generate a proxy mesh corresponding to the input polygonal mesh based on the grouping of two or more sub-meshes.

16. The device according to claim 15, wherein generating the voxel volume comprises:

identifying the boundary voxels that correspond to positions of the polygons of the multiple sub-meshes of the input polygonal mesh;

performing a flood fill from outer edges of a voxel grid to locate voxels that can be reached from the outer edges of the voxel grid without passing through any of the boundary voxels;

identifying the voxels that can be reached from the outer edges of the voxel grid without passing through any of the boundary voxels as outside voxels; and identifying any voxels that are not identified as the boundary voxels or the outside voxels as inside voxels, wherein the inside voxels are voxels that are enclosed by a volume corresponding to the boundary voxels.

17. The device according to claim 15, wherein determining that the first sub-mesh of the multiple sub-meshes is included in the grouping of the two or more sub-meshes comprises:

identifying a second set of voxels that are enclosed by a volume corresponding to the first set of voxels;

removing voxels corresponding to positions of polygons of the first sub-mesh from the first set of voxels to generate a third set of voxels;

identifying a fourth set of voxels that are enclosed by a volume corresponding to the third set of voxels;

comparing the fourth set of voxels to the second set of voxels; and determining whether to include the first sub-mesh in the grouping of two or more sub-meshes based on results of comparing the fourth set of voxels to the second set of voxels, wherein determining whether to include the first sub-mesh in the grouping of two or more sub-meshes comprises:

determining, for the first sub-mesh, a set of conditionally inside voxels that are included in the second set of voxels and not included in the fourth set of voxels.

18. The device according to claim 17, wherein the one or more processors executing the instructions further causes the device to:

in response to the set of conditionally inside voxels including one or more voxels and that none of the voxels in the set of conditionally inside voxels is associated with a group identifier, assign all of the voxels in the set of conditionally inside voxels and the first sub-mesh to a first group identifier, wherein the first group identifier is a group identifier of the grouping of two or more sub-meshes.

19. The device according to claim 17, wherein the one or more processors executing the instructions further causes the device to:

in response to the set of conditionally inside voxels including one or more voxels and that at least one of the voxels in the set of conditionally inside voxels is associated with a group identifier, determine counts of voxels associated with different group identifiers; and assign all of the voxels in the set of conditionally inside voxels and the first sub-mesh to a first group identifier, wherein the first group identifier is the group identifier associated with a largest count of voxels in the set of conditionally inside voxels, wherein the first group identifier is the group identifier of the grouping of two or more sub-meshes.

20. The device according to claim 15, wherein determining that the second sub-mesh of the multiple sub-meshes is not included in the grouping of the two or more sub-meshes comprises:

identifying a second set of voxels that are enclosed by a volume corresponding to the first set of voxels;

removing voxels corresponding to positions of polygons of the second sub-mesh from the first set of voxels to generate a third set of voxels;

identifying a fourth set of voxels that are enclosed by a volume corresponding to the third set of voxels;

comparing the fourth set of voxels to the second set of voxels;

determining, for the second sub-mesh, a set of conditionally inside voxels that are included in the second set of voxels and not included in the fourth set of voxels; and in response to the set of conditionally inside voxels being a null set, determining not to include the second sub-mesh in the grouping of two or more sub-meshes.

* * * * *